United States Patent
Lo et al.

(10) Patent No.: US 12,003,199 B2
(45) Date of Patent: Jun. 4, 2024

(54) MOBILITY ASSISTANCE DEVICE AND DRIVING METHOD THEROF

(71) Applicant: Wistron Corporation, New Taipei (TW)

(72) Inventors: Fu-Nen Lo, New Taipei (TW); Ke-Yu Lan, New Taipei (TW)

(73) Assignee: Wistron Corporation, New Taipei (TW)

( * ) Notice: Subject to any disclaimer, the term of this patent is extended or adjusted under 35 U.S.C. 154(b) by 488 days.

(21) Appl. No.: 17/223,023

(22) Filed: Apr. 6, 2021

(65) Prior Publication Data

US 2022/0216816 A1 Jul. 7, 2022

(30) Foreign Application Priority Data

Jan. 4, 2021 (TW) ................................. 110100082

(51) Int. Cl.
*H02P 23/14* (2006.01)
*A61H 3/00* (2006.01)
(Continued)

(52) U.S. Cl.
CPC ............... *H02P 23/14* (2013.01); *A61H 3/00* (2013.01); *B25J 9/0006* (2013.01); *H02P 25/03* (2016.02);
(Continued)

(58) Field of Classification Search
CPC ............. A61H 3/00; A61H 2201/1642; A61H 2201/165; A61H 1/024; A61H 2201/164;
(Continued)

(56) References Cited

U.S. PATENT DOCUMENTS 9,727,076 B2 * 8/2017 Smith .................... G05G 13/00
10,765,537 B2 * 9/2020 Smith ....................... A61F 2/64
(Continued)

FOREIGN PATENT DOCUMENTS

CN 107147343 9/2017
CN 110757460 2/2020
(Continued)

OTHER PUBLICATIONS

Bilal Akin et al., "Sensorless Field Oriented Control of 3-Phase Permanent Magnet Synchronous Motors", Texas Instruments Incorporated, Jul. 2013, pp. 1-43.
(Continued)

*Primary Examiner* — Thai T Dinh
(74) *Attorney, Agent, or Firm* — JCIPRNET

(57) ABSTRACT

A mobility assistance device and a driving method thereof are provided. The mobility assistance device includes at least one bracket and a driving device which drives the at least one bracket. The driving device includes a brushless direct current (DC) motor, a rotor angle sensor, and a sensing driver. The rotor angle sensor senses the angle of the brushless DC motor. The sensing driver uses a corresponding algorithm to estimate a corresponding angle corresponding to an angle velocity switching of the brushless DC motor. The corresponding angle is used as an angle of the brushless DC motor. The sensing driver drives the brushless DC motor according to the corresponding angle, so that the brushless DC motor provides supporting force to the at least one bracket.

9 Claims, 9 Drawing Sheets

(51) Int. Cl.
*B25J 9/00* (2006.01)
*H02P 25/03* (2016.01)

(52) U.S. Cl.
CPC .............. *A61H 2003/007* (2013.01); *A61H 2201/1215* (2013.01); *A61H 2201/164* (2013.01); *A61H 2201/165* (2013.01); *A61H 2201/5058* (2013.01); *A61H 2201/5069* (2013.01); *A61H 2201/5079* (2013.01); *A61H 2205/106* (2013.01); *A61H 2205/108* (2013.01)

(58) Field of Classification Search
CPC ........ A61H 2201/5061; A61H 2205/12; H02P 25/089; H02P 6/182; H02P 6/16; H02P 23/14; H02P 25/03; B65J 9/0006
See application file for complete search history.

(56) References Cited

U.S. PATENT DOCUMENTS

| | | | | |
|---|---|---|---|---|
| 11,241,801 | B2 * | 2/2022 | Smith | .................... B25J 9/1065 |
| 11,759,944 | B2 * | 9/2023 | Smith | .................... B25J 9/0006 601/5 |
| 2018/0193172 | A1 * | 7/2018 | Smith | ..................... A61F 2/70 |
| 2020/0397600 | A1 | 12/2020 | Smith et al. | |
| 2020/0397601 | A1 | 12/2020 | Smith et al. | |

FOREIGN PATENT DOCUMENTS

| | | | |
|---|---|---|---|
| JP | 2000188891 | 7/2000 | |
| JP | 2008301550 | 12/2008 | |
| JP | 2014087113 | 5/2014 | |
| JP | 2014087217 | 5/2014 | |
| JP | 2018153911 | 10/2018 | |
| TW | I356578 | 1/2012 | |
| TW | I687037 | 3/2020 | |
| WO | 2015093056 | 6/2015 | |
| WO | WO-2015093056 A1 * | 6/2015 | ............... H02P 6/16 |

OTHER PUBLICATIONS

Puru Zhang et al., "A Controller of PMSM for Elctrical Bicycle with Hall Effect Sensors", 2016 IEEE 11th Conference on Industrial Electronics and Applications, Jun. 2016, pp. 619-623.
"Office Action of Taiwan Counterpart Application", dated Sep. 6, 2021, p. 1-p. 12.
"Office Action of China Counterpart Application", dated Jun. 29, 2023, p. 1-p. 7.
"Office Action of Japan Counterpart Application", dated Oct. 4, 2022, p. 1-p. 3.

* cited by examiner

| Motor speed (RPM) | Angles (degrees (°)) calculated through Hall algorithm | Angles (degrees (°)) calculated through sensorless algorithm | Output angles (degrees (°)) |
|---|---|---|---|
| 50 | 3.43 | algorithm is invalid | 3.43 |
| 100 | 3.57 | algorithm is invalid | 3.57 |
| 500 | 3.64 | 2.85 | 2.85 |
| 1000 | 6.36 | 2.89 | 2.89 |
| 2000 | 10.88 | 2.85 | 2.85 |
| 3000 | 15.06 | 2.85 | 2.85 |
| 4000 | 23.12 | 2.84 | 2.84 |
| 5000 | 30.38 | 3.01 | 3.01 |

FIG. 10

MOBILITY ASSISTANCE DEVICE AND DRIVING METHOD THEROF

CROSS-REFERENCE TO RELATED APPLICATION

This application claims the priority benefit of Taiwan application serial no. 110100082, filed on Jan. 4, 2021. The entirety of the above-mentioned patent application is hereby incorporated by reference herein and made a part of this specification.

TECHNICAL FIELD

The disclosure relates to a driving technology of a mobility assistance device, and particularly relates to a mobility assistance device and a driving method thereof.

BACKGROUND

As the world's population is aging, many elderly people want to be less dependent on their families and have the ability to walk on their own without other's assistance, the development of mobility assistance devices (or referred to as exoskeleton assistance devices/exoskeleton robots, etc.) with better cost-effective performance is in progress.

Mobility assistance devices (or referred to as exoskeleton assistance devices/exoskeleton robots) can be worn on the user's body, and operate through the assistance force provided by various motors in the mobility assistance devices, thereby increasing the athletic ability of the user's limbs (mainly lower limbs), for example, assisting the user in excising their leg muscles. However, the price of mobility assistance devices remains high. Therefore, in order to reduce the cost of the mobility assistance devices while still maintaining its proper functions, it is necessary to focus on the motor device, which is the most important part of the mobility assistance device, to consider how to save costs and maintain its functions.

Mobility assistance device and other devices equipped with a motor device have different requirements in terms of control for the motor device. For other devices with a motor device, such as a fan, the motor device is expected to constantly maintain a fixed speed so as to achieve the desired effect. However, due to factors such as walking motion and foot support, the motor device provided on a mobility assistance device constantly changes its speed. That is, the motor device will be constantly switched between low and medium speeds, and the adjustment of low and medium speeds is particularly important for the motor device. Moreover, if there is no proper design, and if the motor device is directly switched between low speed and medium speed, motor vibration will often occur, which will cause discomfort to users of the mobility assistance device.

SUMMARY

The disclosure provides a mobility assistance device and a driving method thereof. By switching the angle velocity corresponding to the brushless DC (direct current) motor to use the corresponding algorithm, a more accurate rotor angle can be obtained to continuously drive the brushless DC motor, thereby saving the cost for constructing the mobility assistance device, reducing power consumption and improving reliability.

In an embodiment of the disclosure, a mobility assistance device includes at least one bracket and a driving device which drives the at least one bracket. The driving device includes a brushless direct current (DC) motor, a rotor angle sensor, and a sensing driver. The rotor angle sensor senses the angle of the brushless DC motor. The sensing driver is coupled to the rotor angle sensor. The sensing driver uses a corresponding algorithm to estimate a corresponding angle corresponding to an angle velocity switching of the brushless DC motor. The corresponding angle is used as an angle of the brushless DC motor. The sensing driver drives the brushless DC motor according to the corresponding angle, so that the brushless DC motor provides a supporting force to the at least one bracket.

An embodiment of the disclosure provides a driving method of a mobility assistance device. The mobility assistance device includes at least one bracket and a driving device for driving the at least one bracket. The driving device includes a brushless DC motor. The driving method includes the following steps: sensing the angle of the brushless DC motor to determine whether the angle velocity switching of the brushless DC motor occurs; and, corresponding to whether the angle velocity switching of the brushless DC motor occurs, using a corresponding algorithm to estimate a corresponding angle, wherein the corresponding angle is used as the angle of the brushless DC motor. The brushless DC motor is driven according to the corresponding angle, so that the brushless DC motor provides a supporting force to the at least one bracket.

BRIEF DESCRIPTION OF THE DRAWINGS

FIG. 10 is an example adopting the motor speeds provided in the embodiment of the disclosure.

DETAILED DESCRIPTION OF DISCLOSED EMBODIMENTS

Figure 1:
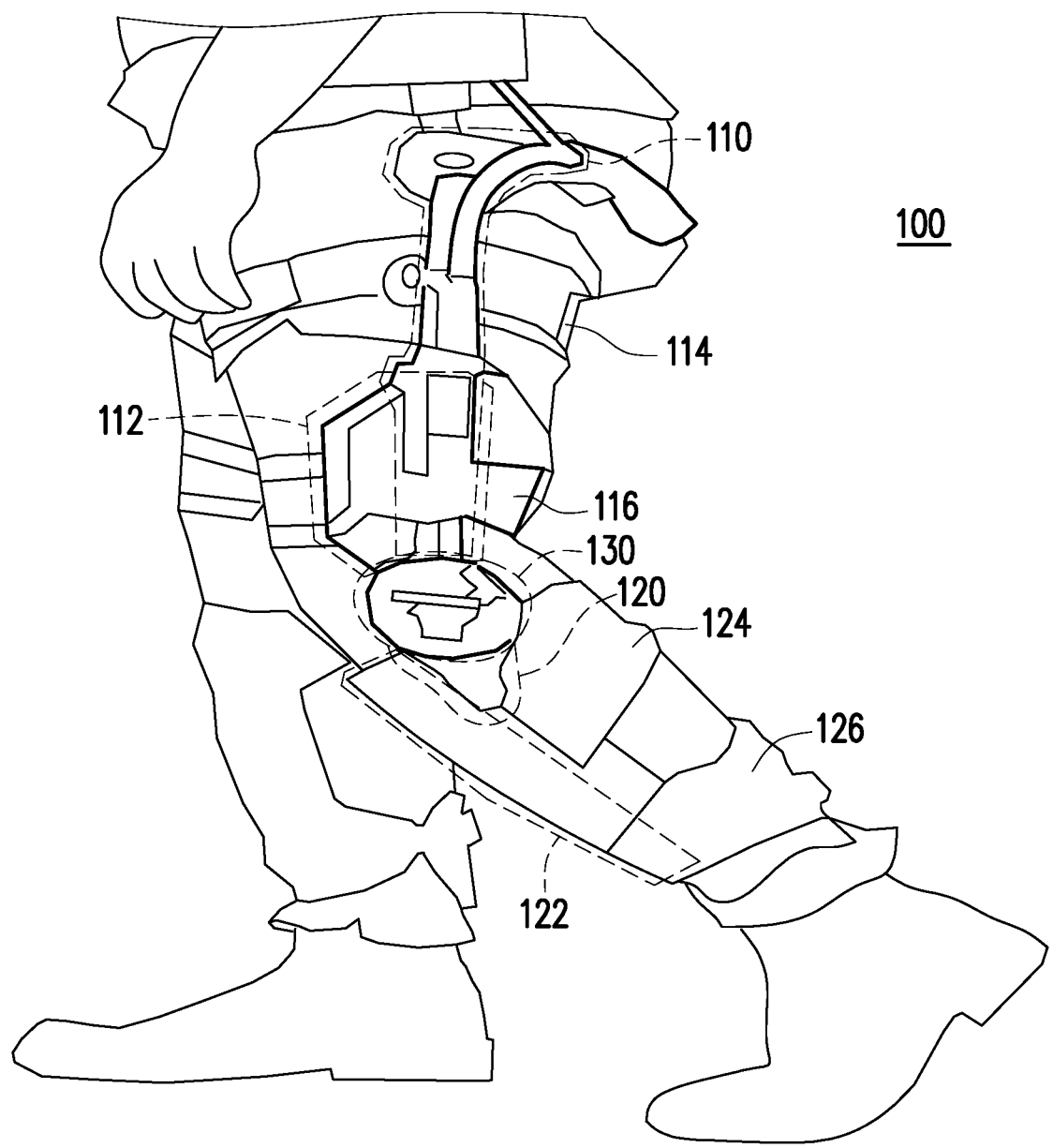
FIG. 1 is a schematic view of a mobility assistance device according to an embodiment of the disclosure.

FIG. 1 is a schematic view of a mobility assistance device 100 according to an embodiment of the disclosure. The user can wear the mobility assistance device 100, which mainly includes at least one bracket and a driving device 130 for driving the brackets. The driving device 130 in this embodiment is an example of a motor device that is arranged between the brackets and provides a supporting force for the brackets. The driving device 130 in this embodiment can be set on the calf of the user. The driving device 130 of the mobility assistance device 100 in the embodiment of the disclosure mainly adopts a brushless DC motor (BLDC motor) as power to generate an assistance force for the user's legs. In detail, the brushless DC motors have the characteristics of large torque, small torque ripple, long service life and so on. In addition, brushless DC motors are commonly used due to their characteristics of being energy-saving, heat-resistant, and easy-to-maintain.

In detail, the brackets of the mobility assistance device 100 include a first bracket 110 (e.g., a thigh bracket used for the user's thigh) and a second bracket 120 (e.g., a calf bracket used for the user's calf). Both the first bracket 110 and the second bracket 120 are coupled to the driving device 130. The sensing driver in the driving device 130 of this embodiment drives the brushless DC motor in the driving device 130 according to the sensed corresponding angle, so that the brushless DC motor in the driving device 130 provides a supporting force respectively to the first bracket 110 and the second bracket 120. The mobility assistance device 100 further includes a first side shield 112 (take the thigh side shield as an example), at least one first strap (such as the first straps 114 and 116) (take the thigh strap as an example), a second side shield 122 (take the calf side shield as an example) and at least one second strap (e.g., second straps 124 and 126) (take the calf strap as an example). The first side shield 112 is fixed to the first bracket 110. The first straps 114 and 116 are connected to the first bracket 110 or the first side shield 112. The first side shield 112 and the first straps 114 and 116 are configured to fix the mobility assistance device 100 on the thigh of the user, so as to facilitate driving the thigh of the user when the driving device 130 provides the supporting force to the first bracket 110.

The second side shield 122 is fixed on the second bracket 120. The second straps 124 and 126 are connected to the second bracket 120 or the first side shield 122. The second side shield 122 and the second straps 124 and 126 are configured to fix the mobility assistance device 100 to the user's calf, so as to facilitate driving the user's calf when the driving device 130 provides the supporting force to the second bracket 120.

Figure 2:
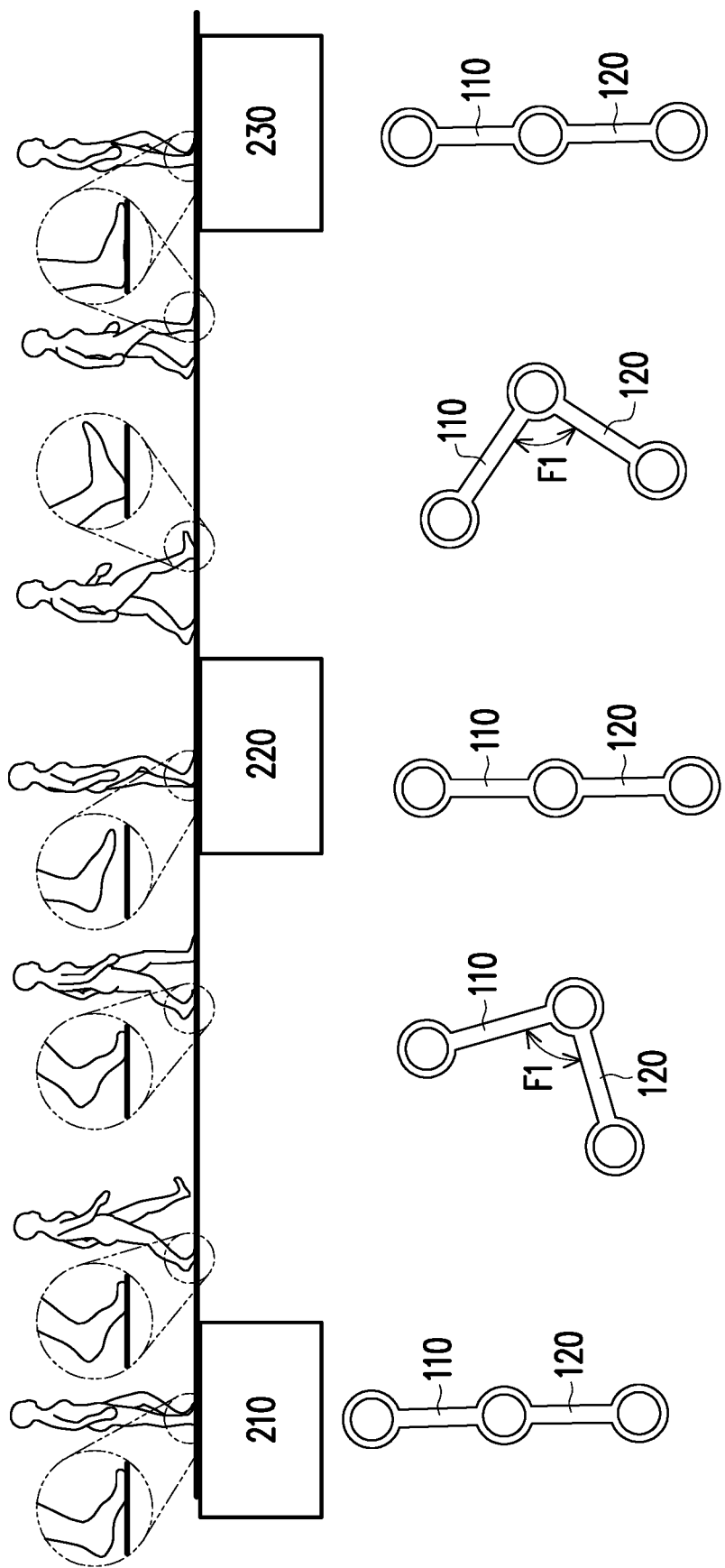
FIG. 2 is a schematic view showing the user, the first bracket (thigh bracket) and the second bracket (calf bracket) when the user is walking.

When the user is wearing the mobility assistance device 100 and walking, the movement of the user's two legs will switch between standing and swinging. FIG. 2 is a schematic view showing the user, the first bracket 110 and the second bracket 120 when the user is walking. Here, an example is provided based on FIG. 2, the first bracket 110 and the second bracket 120 for the user's right leg, and the right motor that provides the supporting force for the right leg. When walking forward, the user will first stand in a standing position (for example, the user's right-leg posture 210 in FIG. 2). Under the circumstances, the right motor does not need to provide the supporting force between the thigh bracket and the calf bracket. Then, from the right-leg posture 210 to the right-leg posture 220 in FIG. 2, the left leg is the support point and the right leg needs to swing at a large angle, therefore at this point the right motor needs to increase the torque of the motor to provide a large supporting force F1 between the thigh bracket and the calf bracket. Then, between the right-leg posture 220 and the right-leg posture 220 of the user in FIG. 2, the torque of the right motor needs to be reduced to reduce its supporting force, so that the leg reaches the predetermined ground support position, and the operation repeats as above. That is to say, the motor adopted for the mobility assistance device 100 often needs to perform forward and reverse rotation operations in a short period of time with high torque and low speed.

However, the currently commonly adopted brushless motors will only maintain a fixed speed in the same direction after being driven, instead of adjusting the speed between different modes. Therefore, due to the different application levels of brushless DC motors, there will be substantive differences in the torque and speed detection technology of brushless DC motors.

The main structure of a brushless electric motor can be divided into a rotor and a stator. The rotor in this embodiment is realized as permanent magnets, and the stator in this embodiment is realized as coils. The brushless DC motor drives the rotor by changing the magnetic field on the stator, so that the motor rotates as a whole. The detection technology of the torque and speed of the brushless DC motor is mainly to detect the angle between the rotor and the stator for the reason that this angle will directly affect the torque and speed of the motor. If the angle between the rotor and the stator cannot be accurately detected or determined, the mobility assistance device 100 will make erroneous judgment when supplying power to the driving device 130 and provide a current that is slightly larger or smaller, and consequently the torque and speed of the driving device 130 will not achieve an expected level. As a result, the driving device 130 often encounters motor vibration, causes noise, and the energy conversion efficiency of the driving device 130 is low, and the user feels a strong sense of discomfort.

Figure 3:
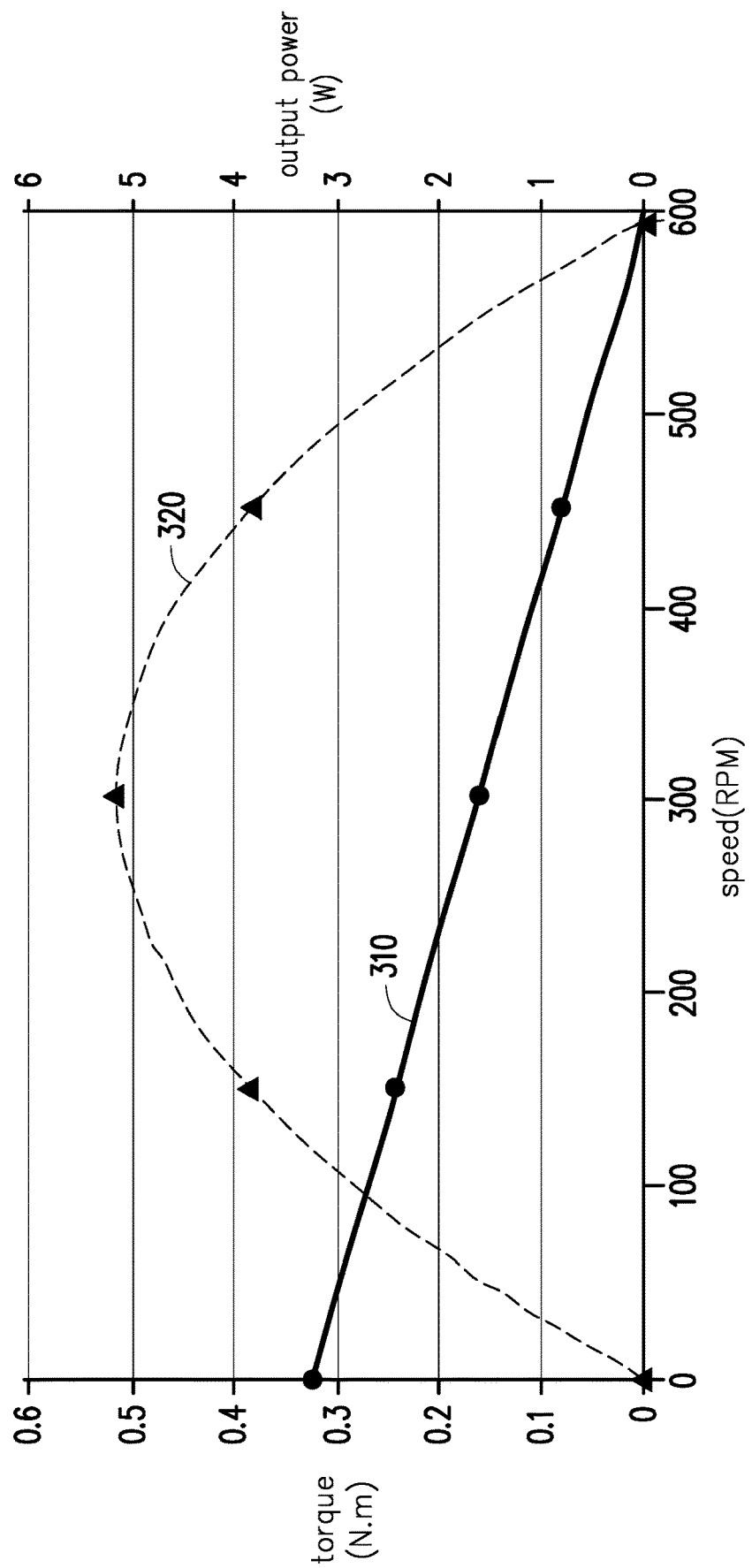
FIG. 3 and FIG. 4A to FIG. 4B illustrate the relationship between the angle between the rotor and the stator of the brushless DC motor and the torque and speed.
Figure 4A:
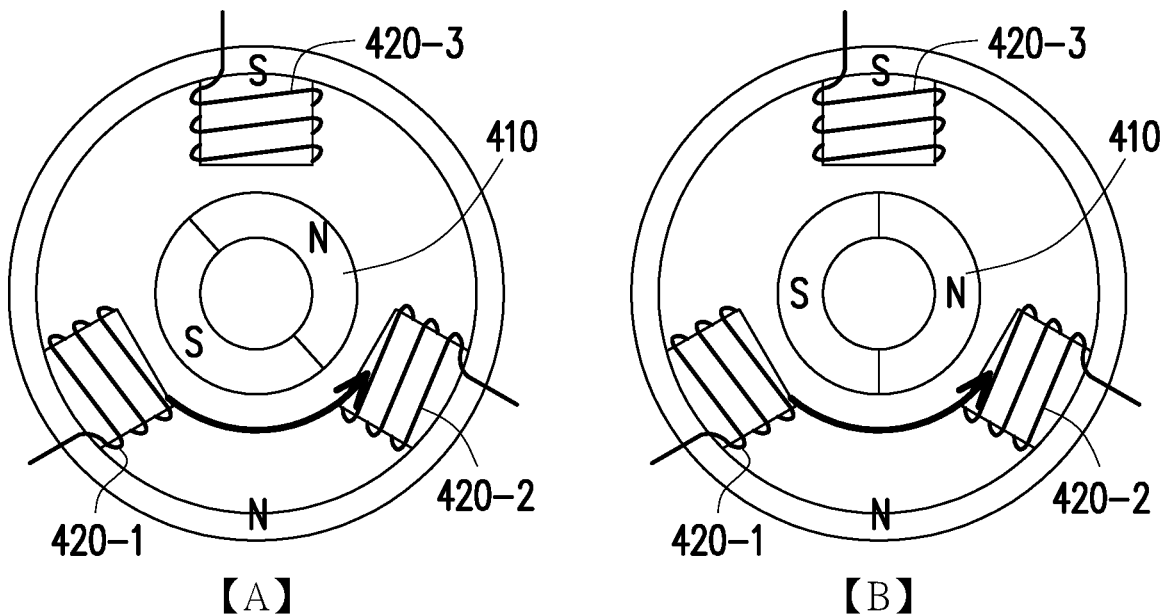
Figure 4B:
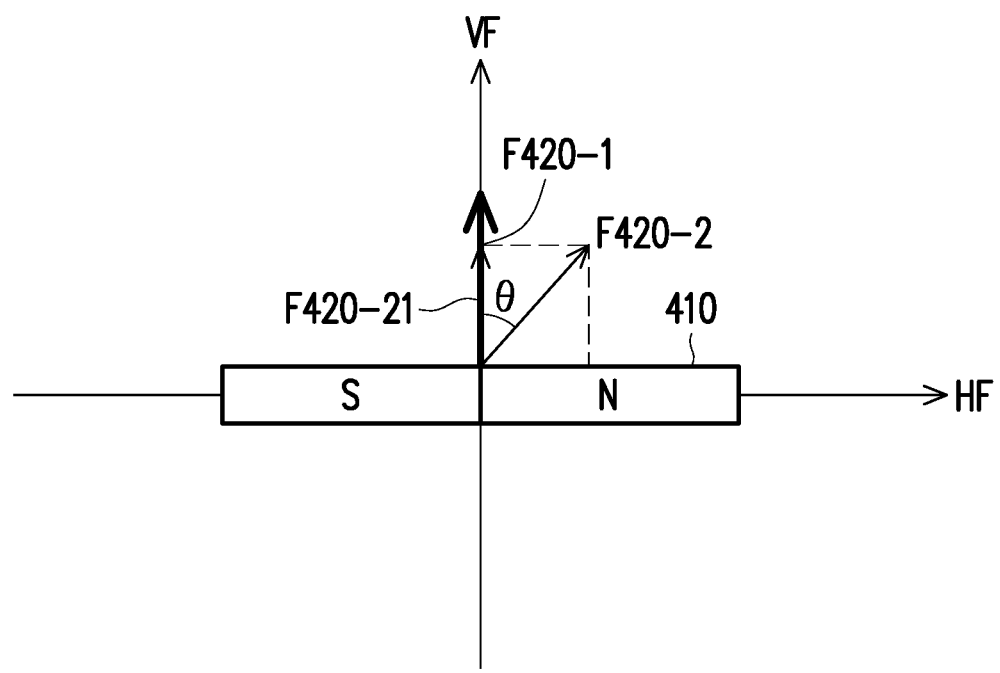

There are many types of methods for detecting the angle between the rotor and the stator of a brushless DC motor, such as algorithms used by a Hall sensor, a step encoder, and sensorless control, etc. FIG. 3 and FIG. 4A to FIG. 4B illustrate the relationship between the angle between the rotor and the stator of the brushless DC motor and the torque and speed.

The torque, speed and output power of the brushless DC motor can be shown in FIG. 3. The X-axis in FIG. 3 shows the speed of the brushless DC motor, and the unit of speed is revolutions per minute (RPM); the Y-axis on the left of FIG. 3 shows the torque of the brushless DC motor, and the unit of torque is Newton-meter (N.m); the Y-axis on the right of FIG. 3 shows the output power of the brushless DC motor, and the unit of output power is watts (W). It can be seen from the straight line 310 in FIG. 3 that the lower the speed of the motor, the greater torque output by the motor. The smaller the torque output by the motor or even there is no torque output by the motor, the maximum speed of the motor can be obtained, as shown by the curve 320 in FIG. 3.

In the control technology of brushless DC motors, the magnetic field on the coil (that is, the "stator") generates different torques due to the change in the position of the rotor. FIG. 4A and FIG. 4B are schematic views illustrating how the position change of the rotor and the angle between the rotor and the stator affect the torque of the motor. The part [A] in the left half of FIG. 4A shows the rotor 410 (i.e., permanent magnets) and stators 420-1 to 420-3 (i.e., coils) of the brushless DC motor, and the angles between the magnetic field of the rotor 410 and the magnetic fields generated by the stators 420-1 to 420-3 intersect at 45 degrees. The part [B] in the right half of FIG. 4A shows that the angles between the magnetic field of the rotor 410 and the magnetic fields generated by the stators 420-1 to 420-3 of the brushless DC motor intersect at 90 degrees. The rotation directions of the stators 420-1 to 420-3 in parts [A] and [B] in FIG. 4A are all counterclockwise.

FIG. 4B illustrates the direction of force applied to the rotor 410 and the stators 420-1 to 420-3 of the brushless DC motor. The vertical force-applying direction is marked as VF, and the horizontal force-applying direction is marked as HF. If the magnetic fields generated by the stators 420-1 to 420-3 apply a vertical force F420-1 to the rotor 410, the force will be completely applied to drive the rotor 410 to rotate, and therefore there will be unnecessary consumption in the force F420-1. On the other hand, if the magnetic fields generated by the stators 420-1 to 420-3 apply a vertical force F420-2 to the rotor 410, the force F420-2 will be divided into the force F420-21 in the same direction as the vertical direction and another force in the same direction as the horizontal direction. Only the force F420-21 in the same direction as the vertical direction will make the rotor 410 rotate. Therefore, another force in the same direction as the horizontal direction will do virtual work and cause unnecessary consumption. Therefore, when the angle of the rotor 410 can be accurately acquired (or the "rotor position" can be accurately acquired), the optimal motor control can be achieved by setting a vertical magnetic field to the angle θ.

This embodiment considers three control techniques for detecting the angle of the rotor 410 of a brushless DC motor, which are encoder control, Hall sensor control, and sensorless control respectively. The three types of control techniques are described briefly.

"Encoder control" is the best choice of control techniques where the encoder serves as the rotor angle sensor of the brushless DC motor in ideal conditions. However, the cost of the encoder is high, and when the encoder is designed in a brushless DC motor, there are problems such as a complicated mechanical structure.

Figure 5:
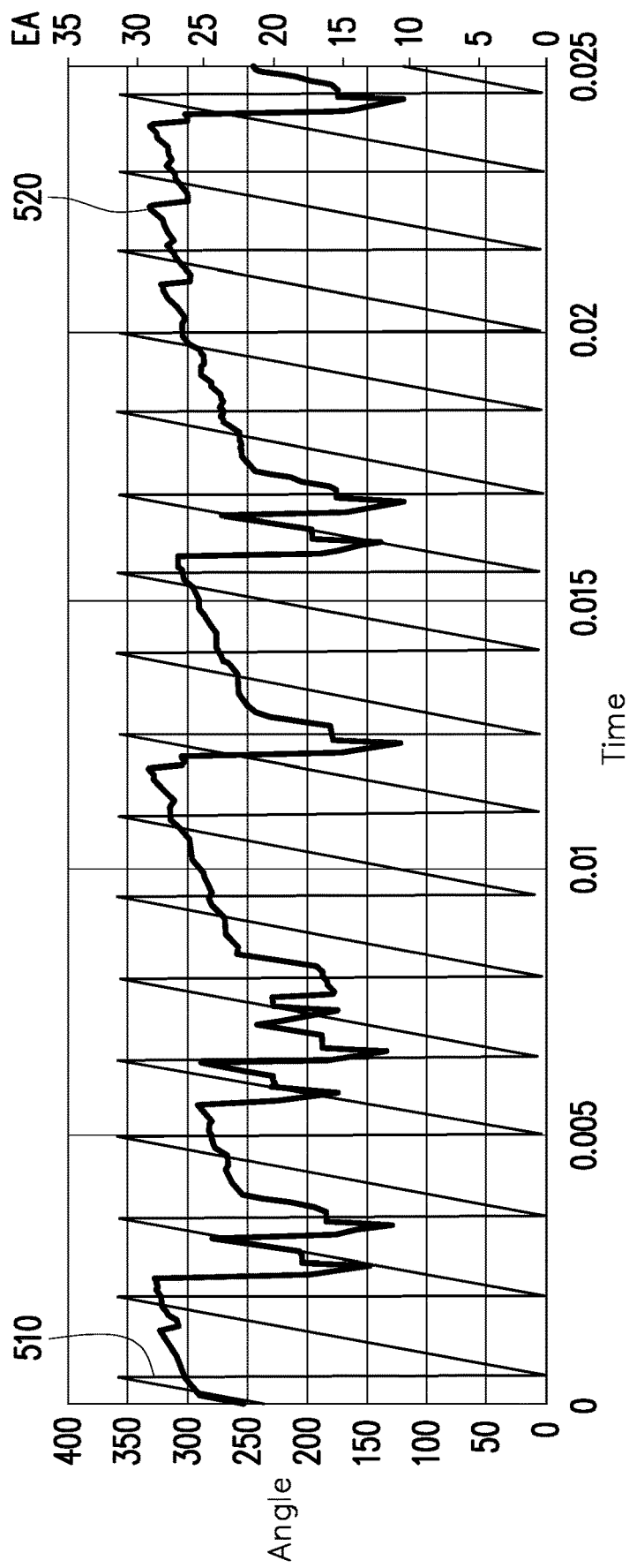
FIG. 5 is a schematic view of the exact rotor angle and the error angle when the Hall sensor is adopted for control.

"Hall sensor control" is to set up three Hall sensors on the brushless DC motor at intervals with 120 degrees to obtain the rotor position. The current rotor angle can be estimated by using the angle sensed by the Hall sensor at the previous sampling time plus the sampling time and the current angle velocity. Since each state of the Hall sensor represents an interval of 60 degrees, every time the state of the Hall sensor changes, it means that a 60-degree rotation has occurred. However, when the motor rotates at a high speed, the estimation error of the speed of the Hall sensor becomes larger. FIG. 5 is a schematic view of the exact rotor angle (for example, the line segment 510 in FIG. 5) and the error angle EA (for example, the line segment 520 in FIG. 5) when the Hall sensor is adopted for control. It can be seen from FIG. 5 that the Hall sensor angle compensation algorithm will also have a larger error when the speed is high. When the error is large, there will be larger fluctuations in the current supplied to the motor, and therefore the rotor in the motor will not rotate smoothly, which will cause vibration and noise in addition to energy consumption.

The principle of "sensorless control" is that the rotor (permanent magnet) generates magnetic induction to the stator (coil winding) when the brushless DC motor rotates. Moreover, it can be learned from the Lenz's Law that when a conductor has magnetic induction, the conductor will generate a corresponding back electromotive force. Therefore, the input voltage and input current supplied to the brushless DC motor, as well as various parameters of the motor (such as the equivalent resistance, the equivalent inductance of the motor, etc.) can be adopted to deduce the angle information through the back electromotive force. In other words, the sensorless angle compensation algorithm can estimate the back electromotive force only when the parameters of the motor and the power supply to the motor (such as the voltage and current supplied to the motor) are determined. Although "sensorless control" has high rotor angle accuracy, the rotor angle can be estimated only when the motor has the back electromotive force. Therefore, when the motor is stationary, the rotor angle cannot be estimated.

Therefore, the embodiments of the disclosure can adopt the corresponding algorithm to estimate the angle of the brushless DC motor corresponding to the angle velocity switching in the speed change of the brushless DC motor, thereby using the estimated angles to drive the brushless DC motor. In detail, when the speed of the brushless DC motor is low, the Hall sensor angle compensation algorithm is adopted to calculate the angle of the brushless DC motor at this time point. When the brushless DC motor rotates at a specific speed, the angle of the brushless DC motor at this time point can be calculated through the sensorless control technology (that is, the sensorless angle compensation algorithm) and the back electromotive force of the brushless DC motor. By using this approach mixed and matched with the sensorless angle compensation algorithm (also known as sensorless control) and the Hall sensor angle compensation algorithm of the brushless DC motor, it is possible to obtain an accurate rotor angle in the motor, thereby accurately controlling the driving current supplied to the motor, reducing the vibration of motor and decreasing the discomfort caused to the user when using the mobility assistance device.

FIG. 10 is an example adopting the motor speeds provided in the embodiment of the disclosure, describing the angles calculated through the Hall sensor angle compensation algorithm (referred to as the Hall algorithm in this embodiment), the angles calculated through the sensorless angle compensation algorithm (referred to as the sensorless algorithm in this embodiment), and the output angles calculated through the motor control algorithm that combines the above two algorithms in the embodiment of the disclosure.

In this embodiment, it can be seen from FIG. 10 that when the motor is at a low speed, for example, the motor speed is lower than a predetermined speed (500 RPM is taken as an example here), the Hall algorithm has a more stable and accurate detection on the rotor angle of the motor, and algorithm will not be invalid. On the other hand, when the motor rotates at a low speed (for example, the motor speed is lower than 500 RPM), invalidation problem will occur to the sensorless algorithm. When the motor is at a high speed (for example, the motor speed is higher than 500 RPM), the Hall algorithm may have a large error in detecting the rotor angle of the motor. On the other hand, when the motor is at a high speed (for example, the motor speed is higher than 500 RPM), the sensorless algorithm has a more stable and accurate detection on the rotor angle of the motor. Therefore, in this embodiment, when the motor is switched from a low speed to a high speed, the algorithm for estimating the rotor angle of the motor will be switched from the Hall algorithm to the sensorless algorithm. Those applying this embodiment can adjust the value of the predetermined speed according to their needs, for example, determining the predetermined speed by using experimental data. In other words, when the rotation angle velocity of the motor reaches a level under which the Hall algorithm cannot work properly (that is, there is a significant difference from the actual rotor angle velocity), the Hall algorithm is switched to the sensorless algorithm. After switching, the angle estimated by the sensorless algorithm is output as the operation angle of the rotor of the motor. In this embodiment, an angle velocity (e.g., 500 RPM serves as the reference for determining the speed) for switching is designed to ensure that the speed of the motor is high enough to prevent the motor from stopping.

In addition, when the motor is activated to switch from a low speed to a high speed, because the rotor angle velocity is zero, there is no back electromotive force to generate voltage and current, it is impossible to perform operation with the sensorless algorithm. Therefore, the Hall sensor needs to be adopted and cooperate with the Hall algorithm to drive the motor and estimate the rotor angle.

In the embodiment, the "angle velocity switching of a brushless DC motor" refers to the switching of angle velocity of the brushless DC motor under two conditions. That is, one of the conditions mentioned above is that the brushless DC motor switches from a high speed/high angle velocity (also called the first speed range) to a low speed/low angle velocity (also called the second speed range). The other condition mentioned above is that the brushless DC motor switches from a low speed/low angle velocity (second speed range) to a high speed/high angle velocity (first speed range). The aforementioned "high speed/high angle velocity" (first speed range) and "low speed/low angle velocity" (second speed range) can be determined through the predetermined speed. The first speed range indicates the state where the angle of the brushless DC motor is larger than the predetermined speed when the rotor angle sensor (Hall sensor) detects the rotor angle of the brushless DC motor and generates the detection result. The second speed range indicates the state where the angle of the brushless DC motor is smaller than the predetermined speed when the rotor angle sensor (Hall sensor) detects the rotor angle of the brushless DC motor and generates the detection result.

However, whether the sensorless algorithm is operating normally cannot be determined accurately based on the speed of the motor alone. In order to avoid that the sensorless angle compensation algorithm might not operate normally, this embodiment also performs subtraction on the angle calculated through the sensorless angle compensation algorithm and the angle calculated through the Hall sensor angle compensation algorithm to obtain the angle error value of the two angles as the maximum error reference. Meanwhile, the predetermined sensitivity value is adopted to determine whether the error value of the two angles is significantly different from, for example, the predetermined sensitivity value. In that case, the algorithm needs to be adjusted to adopt the angle calculated through the Hall sensor angle compensation algorithm as the rotor angle. In other words, when the angle error value is smaller than or equal to the predetermined sensitivity value, it means that the two angle values calculated through the sensorless angle compensation algorithm and the Hall sensor angle compensation algorithm are similar. In this embodiment, the angle value calculated through the sensorless angle compensation algorithm is adopted as the rotor angle in the motor. Conversely, when the angle error value is larger than the predetermined sensitivity value, it means that the sensorless angle compensation algorithm may not work normally. Therefore, the angle value calculated through the Hall sensor angle compensation algorithm is adopted instead as the rotor angle in the motor.

On the other hand, when the motor is switched from a high speed to a low speed, the algorithm for estimating the rotor angle in the motor will be switched from the sensorless algorithm to the Hall algorithm. In this embodiment, an angle velocity (for example, 500 RPM serves as the reference for determining the speed) for switching is designed as a standard for the motor at low speed. Such design is made to prevent the motor from stopping unexpectedly due to external force or braking action when the embodiment performs the sensorless algorithm, and the unexpected stop of motor will cause the driver to act abnormally. In this embodiment, it is also simultaneously determined whether the Hall sensor and the corresponding Hall algorithm are operating normally to ensure the normal operation of the sensorless algorithm.

Figure 6:
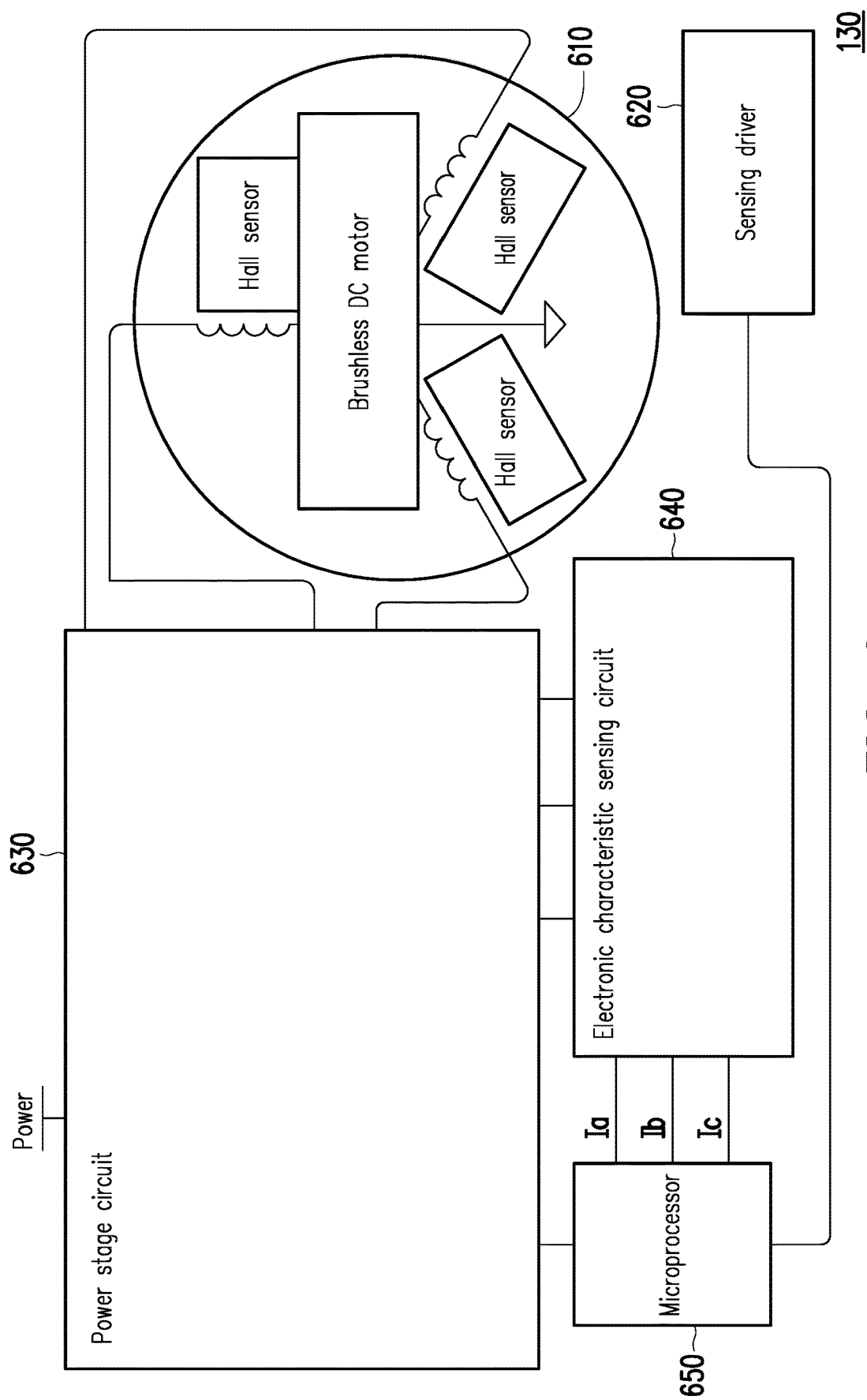
FIG. 6 is a schematic view of a motor device in a mobility assistance device according to an embodiment of the disclosure.

FIG. 6 is a schematic view of a motor device 130 in a mobility assistance device 100 according to an embodiment of the disclosure. The driving device 130 mainly includes a brushless DC motor 610, a rotor angle sensor (three Hall sensors are taken as an example in this embodiment), and a sensing driver 620. The sensing driver 620 is coupled to the rotor angle sensor. The rotor angle sensor (Hall sensor) is configured to detect the rotor angle in the brushless DC motor 610 and generate a detection result. The driving device 130 may further include a power stage circuit 630, an electronic characteristic sensing circuit 640, and a microprocessor 650. The power stage circuit 630 supplies power to the brushless DC motor 610, the rotor angle sensor (Hall sensor), the electronic characteristic sensing circuit 640, and the microprocessor 650 through the current mirror and the power circuit. The electronic characteristic sensing circuit 640 converts the sensing result of the rotor angle sensor (Hall sensor) into analog current signals Ia, Ib, and Ic. The microprocessor 650 converts the analog current signals Ia, Ib, and Ic into digital signals that the sensing driver 620 can obtain.

Figure 7:
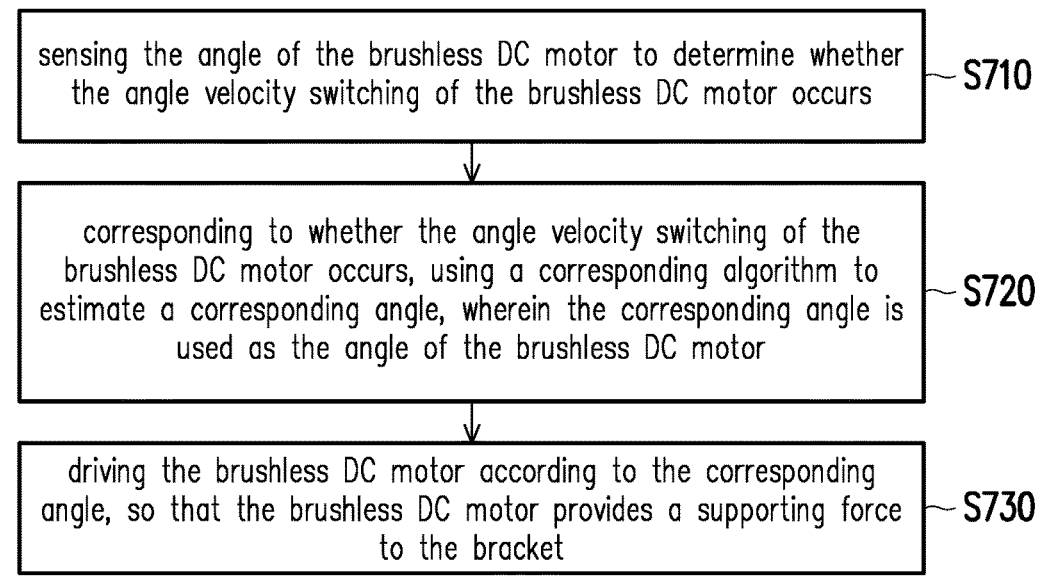
FIG. 7 is a flowchart of a driving method of a mobility assistance device according to an embodiment of the disclosure.

FIG. 7 is a flowchart of a driving method of a mobility assistance device according to an embodiment of the disclosure. The driving method in FIG. 7 can be applied to the mobility assisting device 100 in FIG. 1 and the driving device 130 in FIG. 6. Referring to FIG. 6 and FIG. 7 both, in step S710, the sensing driver 620 senses the angle of the brushless DC motor 610 to determine whether the angle velocity switching of the brushless DC motor 610 occurs. In detail, the Hall sensor detects the angle of the brushless DC motor 610 and generates a detection result. For example, through the power stage circuit 630, the electronic characteristic sensing circuit 640, and the microprocessor 650, the digital signal is provided to the sensing driver 620 as the sensing result. The sensing driver 620 determines whether the current speed of the brushless DC motor 610 exceeds a predetermined speed according to the detection result, thereby determining whether the angle velocity switching of the brushless DC motor 610 occurs. In step S720, the sensing driver 620 uses a corresponding algorithm to estimate a corresponding angle corresponding to whether or not the switching of the brushless DC motor 610 occurs, wherein the corresponding angle is adopted as the angle of the brushless DC motor 610 to drive the brushless DC motor 610.

Figure 8:
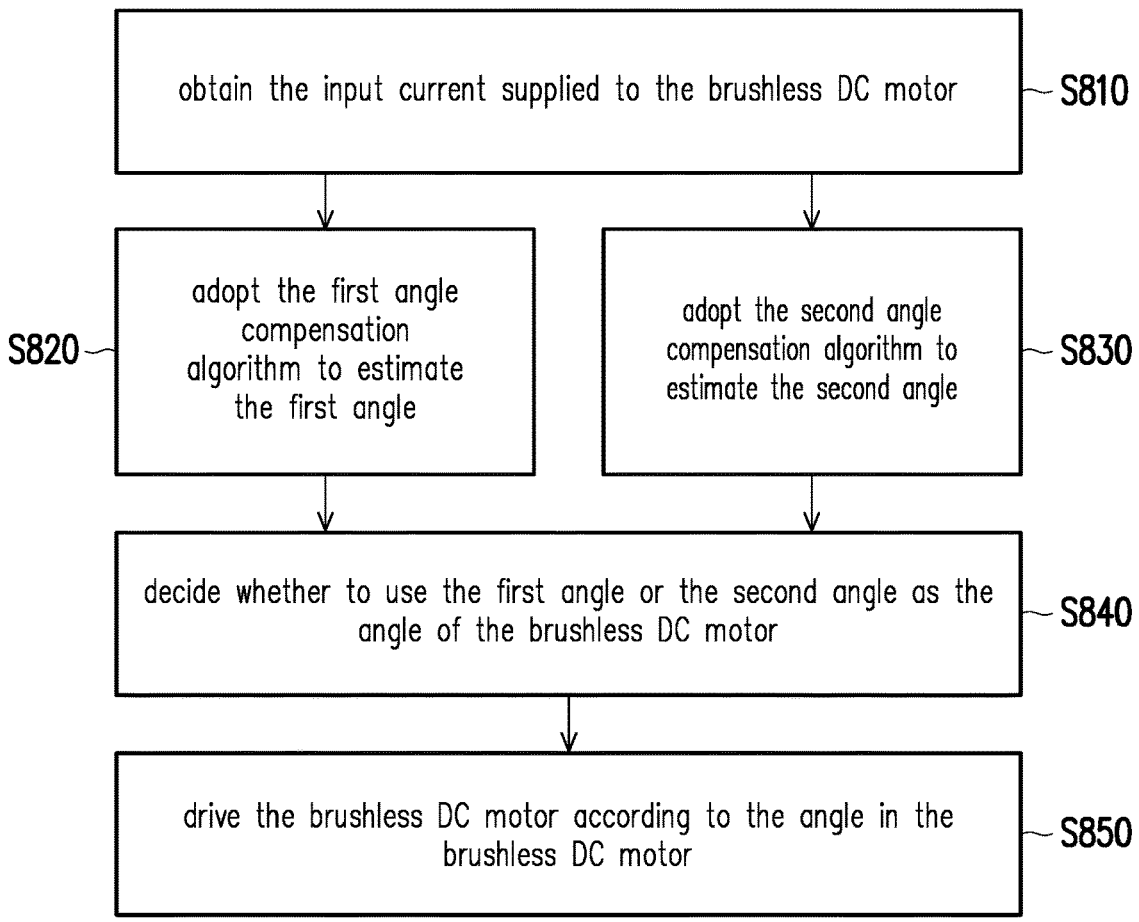
FIG. 8 is a detailed flowchart of step S720 in FIG. 7.

FIG. 8 is a detailed flowchart of step S720 in FIG. 7. In step S810, the sensing driver 620 can obtain the input current supplied to the brushless DC motor 610 from the power stage circuit 630 or the microprocessor 650.

In step S820, the sensing driver uses the first angle compensation algorithm (that is, the Hall sensor angle compensation algorithm) to estimate the first angle. The first angle compensation algorithm (Hall sensor angle compensation algorithm) estimates the first angle mainly based on the detection result of the brushless DC motor 610. In step S830, the sensing driver 620 adopts the second angle compensation algorithm (that is, the sensorless angle compensation algorithm) to estimate the second angle. The second angle compensation algorithm (sensorless angle compensation algorithm) calculates the back electromotive force of the brushless DC motor 610 to estimate the second angle mainly based on the input current of the brushless DC motor 610 and multiple parameters of the brushless DC motor 610 (such as equivalent resistance, equivalent inductance, etc.). Steps S720 and S730 can be carried out simultaneously or in sequence.

In step S840, the sensing driver 620 decides to use the first angle or the second angle as the angle of the brushless DC motor 610. The sensing driver 620 in this embodiment mainly determines whether the current speed of the brushless DC motor 610 exceeds a predetermined speed (for example, 500 RPM), thereby determining whether to use the first angle or the second angle as the angle of the brushless DC motor 610. In addition, the sensing driver 620 in this embodiment can also calculate the current angle error between the first angle and the second angle, so as to determine whether the current angle error is greater than a predetermined sensitivity, and thereby deciding whether to use the first angle or the second angle as the angle in the brushless DC motor 620. In step S850, the sensing driver 620 determines the input current to be provided according to the angle in the brushless DC motor 610, so as to continue to drive the brushless DC motor 610. For example, the vector control algorithm of the motor can be adopted to convert the three-way current of the stator into the rotor coordinate vector; the current controller can be adopted to convert the input current and the control current into voltage commands; the voltage vector of the rotor can be converted to the three-way voltage of the stator. Moreover, the power stage circuit 630 can be adopted to set the switching state generated by the inverter algorithm.

Figure 9:
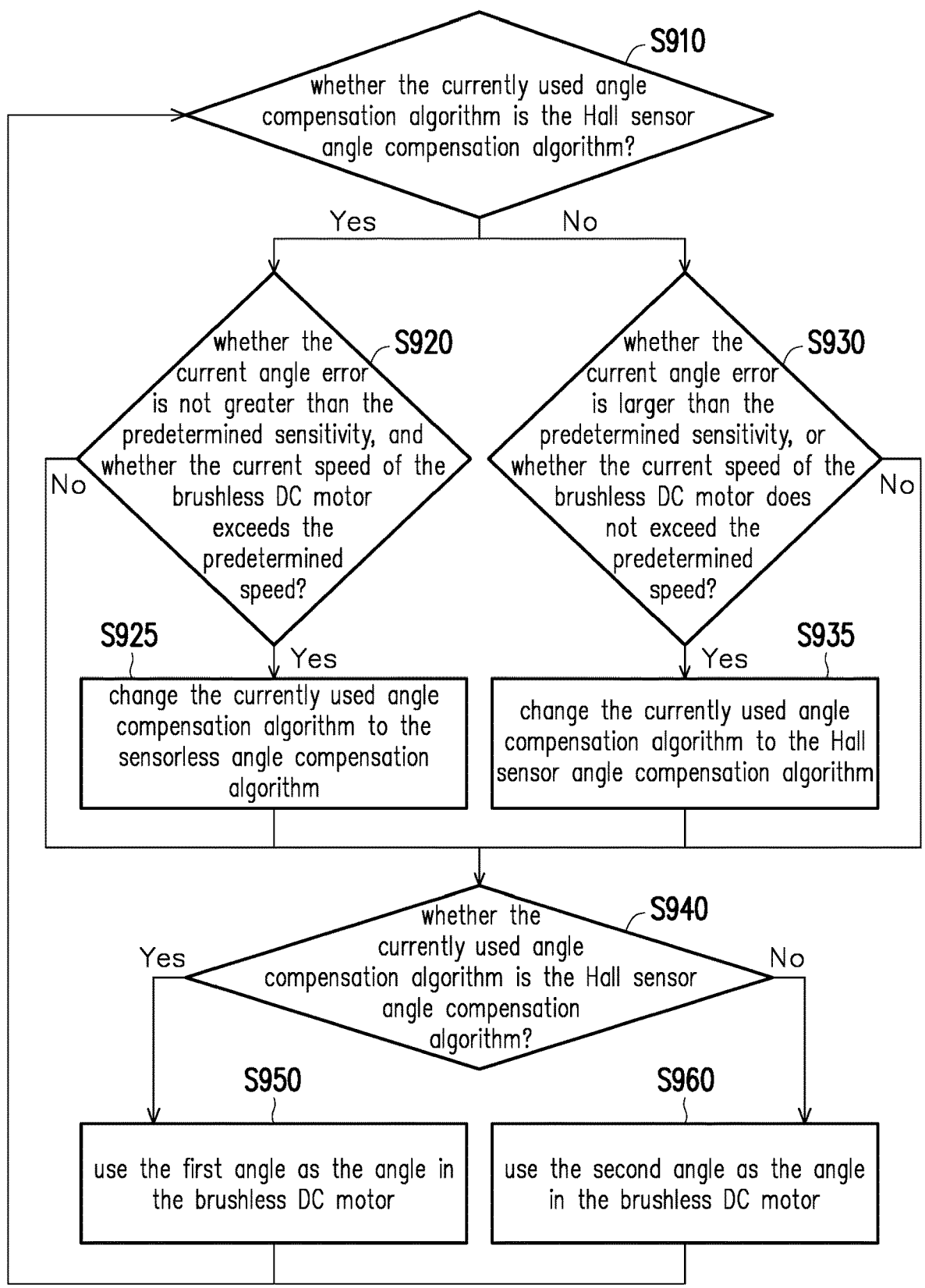
FIG. 9 is a detailed flowchart of step S840 in FIG. 8.

FIG. 9 is a detailed flowchart of step S840 in FIG. 8. Referring to FIG. 6 and FIG. 9 both, in step S910, the sensing driver 620 determines whether the currently used angle compensation algorithm is the first angle compensation algorithm (that is, the Hall sensor angle compensation algorithm). If the determining result in step S910 is YES, proceed to step S920, the sensing driver 620 determines whether the current angle error between the first angle and the second angle is not greater than the predetermined sensitivity, and whether the current speed of the brushless DC motor 610 exceeds the predetermined speed (for example, 500 RPM). If all the determining results in step S920 are YES, step S925 is performed to change the currently used angle compensation algorithm to the second angle compensation algorithm (sensorless angle compensation algorithm). When one of the determining results in step S920 is NO (for example, the current angle error between the first angle and the second angle is smaller than the predetermined sensitivity, or the current speed of the brushless DC motor 610 does not exceed the predetermined speed), step S940 is performed, and no adjustment is made to the currently used angle compensation algorithm.

If the determining result in step S910 is NO, then step S930 is performed, and the sensing driver 620 determines whether the current angle error between the first angle and the second angle is larger than the predetermined sensitivity, or whether the current speed of the brushless DC motor 610 does not exceed the predetermined speed (for example, 500 RPM). When one of the determining results in step S930 is YES (the current angle error between the first angle and the second angle is greater than the predetermined sensitivity, or the current speed of the brushless DC motor 610 does not exceed the predetermined speed), step S935 is performed to change the currently used angle compensation algorithm to the first angle compensation algorithm (Hall sensor angle compensation algorithm). When all the determining results in step S930 are NO (for example, the current angle error between the first angle and the second angle is smaller than the predetermined sensitivity and the current speed of the brushless DC motor 610 exceeds the predetermined speed), step S940 is performed, and no adjustment is made to the currently used angle compensation algorithm.

In step S940, the sensing driver 620 determines whether the current angle compensation algorithm is the first angle compensation algorithm (Hall sensor angle compensation algorithm). If the determining result in step S940 is YES, the sensing driver 620 adopts the first angle as the angle in the brushless DC motor 610. If the determining result in step S940 is NO, the sensing driver 620 adopts the second angle as the angle in the brushless DC motor 610. When step S950 or step S960 ends, return to step S910 to continue the process.

In summary, the mobility assistance device and the driving method thereof in the embodiments of the disclosure adopt a mixed use of the sensorless angle compensation algorithm (also known as sensorless control) and the Hall sensor angle compensation algorithm directed at the brushless DC motor. In other words, when the speed of the brushless DC motor is low, the Hall sensor angle compensation algorithm is adopted to calculate the angle of the brushless DC motor at this time point; when the brushless DC motor operates at a specific speed, the sensorless control technology (that is, the sensorless angle compensation algorithm) and the back electromotive force of the brushless DC motor are adopted to calculate the angle of the brushless DC motor at this time point. In addition, subtraction is performed on the angle calculated through the sensorless angle compensation algorithm and the angle calculated through the Hall sensor angle compensation algorithm to obtain the angle error value of the two angles. Furthermore, the predetermined sensitivity value is adopted to determine whether the error value of the two angles is significantly different from, for example, the predetermined sensitivity value, in which case the angle calculated through the Hall sensor angle compensation algorithm will be adopted instead. In this way, the brushless DC motor in the embodiment of the disclosure is not equipped with the most accurate (but also the most expensive) stepping encoder, but instead is equipped with a low-accuracy but relatively inexpensive Hall sensor. Moreover, when the speed of the motor is high, the calculation of the rotor angle is changed from the Hall sensor angle compensation algorithm to a more accurate sensorless angle compensation algorithm. As such, the construction cost for the mobility assistance device can be saved, power consumption can be reduced, and reliability can be improved. In addition, the embodiment of the disclosure can provide a driving circuit more accurately by accurately acquiring the rotor angle of the motor, thereby reducing the vibration of the motor and reducing the discomfort when using the mobility assistance device.

What is claimed is:

1. A mobility assistance device, comprising:
   at least one bracket; and
   a driving device, coupled to the at least one bracket, wherein the driving device comprises:
   a brushless direct current (DC) motor;
   a rotor angle sensor, sensing an angle of the brushless DC motor; and
   a sensing driver, coupled to the rotor angle sensor, and using a corresponding algorithm to estimate a corresponding angle corresponding to an angle velocity switching of the brushless DC motor, wherein the corresponding angle is used as an angle of the brushless DC motor, the sensing driver drives the brushless DC motor according to the corresponding angle, so that the brushless DC motor provides a supporting force to the at least one bracket,
   wherein the rotor angle sensor detects the angle of the brushless DC motor and generates a detection result, the sensing driver determines whether a current speed of the brushless DC motor exceeds a predetermined speed according to the detection result, thereby determining whether an angle velocity switching of the brushless DC motor occurs, wherein the corresponding algorithm comprises a Hall sensor angle compensation algorithm and a sensorless angle compensation algorithm, the Hall sensor angle compensation algorithm estimates a first angle based on the detection result of the brushless DC motor, and the sensorless angle compensation algorithm estimates a second angle based on a plurality of parameters and a power supply condition of the brushless DC motor, wherein the sensing driver further calculates a current angle error between the first angle and the second angle, the sensing driver determines whether the angle velocity switching of the brushless DC motor occurs, so as to determine whether to use the first angle obtained from the Hall sensor angle compensation algorithm or the second angle obtained from the sensorless angle compensation algorithm as the angle of the brushless DC motor, and drive the brushless DC motor according to the angle of the brushless DC motor, wherein when the current angle error is larger than a predetermined sensitivity or the current speed of the brushless DC motor does not exceed the predetermined speed, the sensing driver adopts the first angle obtained from the Hall sensor angle compensation algorithm as the angle of the brushless DC motor, when the current angle error is not larger than the predetermined sensitivity and the current speed of the brushless DC motor exceeds the predetermined speed, the sensing driver adopts the second angle obtained from the sensorless angle compensation algorithm as the angle of the brushless DC motor.

2. The mobility assistance device according to claim 1, wherein the condition of determining whether the angle velocity switching of the brushless DC motor occurs is:

the sensing driver determines the condition where the angle of the brushless DC motor changes from a first speed range to a second speed range, or, the sensing driver determines the condition where the angle of the brushless DC motor changes from the second speed range to the first speed range, wherein the first speed range indicates a state where the angle of the brushless DC motor is larger than the predetermined speed in the detection result, and the second speed range indicates a state where the angle of the brushless DC motor is smaller than or equal to the predetermined speed in the detection result.

3. The mobility assistance device according to claim 1, wherein the rotor angle sensor is a Hall sensor.

4. The mobility assistance device according to claim 1, wherein the sensorless angle compensation algorithm calculates a back electromotive force of the brushless DC motor based on an input current of the brushless DC motor and the plurality of parameters of the brushless DC motor, thereby estimating the second angle, wherein the sensorless angle compensation algorithm does not estimate the second angle based on the detection result of the brushless DC motor.

5. The mobility assistance device according to claim 1, wherein the at least one bracket comprises:

a first bracket, coupled to the driving device; and
a second bracket, coupled to the driving device,
wherein the sensing driver is configured to drive the brushless DC motor according to the corresponding angle, such that the brushless DC motor supplies a supporting force to the first bracket and the second bracket respectively.

6. The mobility assistance device according to claim 5, further comprising:

a first side shield, fixed on the first bracket;
at least one first strap, connected to the first bracket or the first side shield;
a second side shield, fixed on the second bracket; and
at least one second strap, connected to the first bracket or the second side shield,
wherein the first side shield, the at least one first strap, the second side shield and the at least one second strap are configured for fixing the mobility assistance device to a user.

7. A driving method of a mobility assistance device, wherein the mobility assistance device comprises at least one bracket and a driving device coupled to the at least one bracket, the driving device comprises a brushless DC motor, wherein the driving method comprises:

sensing an angle of the brushless DC motor to determine whether an angle velocity switching of the brushless DC motor occurs;

corresponding to whether the angle velocity switching of the brushless DC motor occurs, using a corresponding algorithm to estimate a corresponding angle, wherein the corresponding angle is used as the angle of the brushless DC motor; and driving the brushless DC motor according to the corresponding angle, so that the brushless DC motor provides a supporting force to the at least one bracket, wherein the corresponding algorithm comprises a Hall sensor angle compensation algorithm and a sensorless angle compensation algorithm, the Hall sensor angle compensation algorithm estimates a first angle based on the detection result of the brushless DC motor, and the sensorless angle compensation algorithm estimates a second angle based on a plurality of parameters and a power supply condition of the brushless DC motor, the driving method further comprising:

calculating a current angle error between the first angle and the second angle, wherein the step of using the corresponding algorithm to estimate the corresponding angle which is used as the angle of the brushless DC motor corresponding to whether the angle velocity switching of the brushless DC motor occurs comprises:

determining whether the angle velocity switching of the brushless DC motor occurs, so as to determine whether to use the first angle obtained from the Hall sensor angle compensation algorithm or a second angle obtained from the sensorless angle compensation algorithm as the angle of the brushless DC motor, when the current angle error is larger than the predetermined sensitivity or the current speed of the brushless DC motor does not exceed the predetermined speed, the first angle obtained from the Hall sensor angle compensation algorithm is adopted as the angle of the brushless DC motor; and when the current angle error is not larger than the predetermined sensitivity and the current speed of the brushless DC motor exceeds the predetermined speed, the second angle obtained from the sensorless angle compensation algorithm is adopted as the angle of the brushless DC motor.

8. The driving method according to claim 7, wherein the step of determining whether the angle velocity switching of the brushless DC motor occurs comprises:

detecting the angle of the brushless DC motor and generating a detection result; and determining, according to the detection result, whether a current speed of the brushless DC motor exceeds a predetermined speed, so as to determine whether the angle velocity switching of the brushless DC motor occurs, wherein the condition of determining whether the angle velocity switching of the brushless DC motor occurs is:

determining the condition where the angle of the brushless DC motor changes from a first speed range to a second speed range, or, determining the condition where the angle of the brushless DC motor changes from the second speed range to the first speed range, wherein the first speed range indicates a state where the angle of the brushless DC motor is larger than the predetermined speed in the detection result, and the second speed range indicates a state where the angle of the brushless DC motor is smaller than or equal to the predetermined speed in the detection result.

9. The driving method according to claim 7, wherein the sensorless angle compensation algorithm calculates a back electromotive force of the brushless DC motor based on an input current of the brushless DC motor and a plurality of parameters of the brushless DC motor, thereby estimating the second angle, wherein the sensorless angle compensation algorithm does not estimate the second angle based on the detection result of the brushless DC motor.

* * * * *